United States Patent
Hu et al.

(10) Patent No.: US 11,747,677 B2
(45) Date of Patent: Sep. 5, 2023

(54) BACKLIGHT MODULE AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventors: Xiaogang Hu, Chongqing (CN); Haoxuan Zheng, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/063,222

(22) Filed: Dec. 8, 2022

(65) Prior Publication Data
US 2023/0205005 A1    Jun. 29, 2023

(30) Foreign Application Priority Data
Dec. 29, 2021  (CN) .......................... 202111647904.X (51) Int. Cl.
*G02F 1/13357* (2006.01)

(52) U.S. Cl.
CPC .. *G02F 1/133608* (2013.01); *G02F 1/133606* (2013.01)

(58) Field of Classification Search
CPC .................. G02F 1/133606; G02F 1/133608
See application file for complete search history.

(56) References Cited

FOREIGN PATENT DOCUMENTS

| CN | 110095902 A |   | 8/2019  |             |
|----|-------------|---|---------|-------------|
| CN | 209514259 U |   | 10/2019 |             |
| CN | 111158189 A |   | 5/2020  |             |
| CN | 111856815 A | * | 10/2020 | G02F 1/133615 |
| CN | 111856815 A |   | 10/2020 |             |
| CN | 112799250 A |   | 5/2021  |             |
| CN | 113223406 A |   | 8/2021  |             |

(Continued)

OTHER PUBLICATIONS

First Office Action issued in counterpart Chinese Patent Application No. 202111647904.X, dated Jun. 1, 2022.

(Continued)

*Primary Examiner* — Matthew J. Peerce
(74) *Attorney, Agent, or Firm* — Westbridge IP LLC (57) ABSTRACT

Disclosed are a backlight module and a display device. The backlight module includes a backplane and a light bar. The backplane includes a bottom plate and a side plate assembly, the side plate assembly is connected to the bottom plate and is enclosed with the bottom plate to form an accommodating cavity, the light bar is located in the accommodating cavity and is installed on the bottom plate; the light bar has a main body part and an edge part surrounding the main body part, the backlight module further includes a first light absorbing member and/or a first light condensing member disposed between the side plate assembly and the edge part of the light bar.

11 Claims, 4 Drawing Sheets

(56) References Cited

FOREIGN PATENT DOCUMENTS

| CN | 113485049 A | 10/2021 |
|---|---|---|
| KR | 20100067820 A | 6/2010 |

OTHER PUBLICATIONS

Refusal Decision issued in counterpart Chinese Patent Application No. 202111647904.X, dated Oct. 31, 2022.
Second Office Action issued in counterpart Chinese Patent Application No. 202111647904.X, dated Aug. 31, 2022.

* cited by examiner

BACKLIGHT MODULE AND DISPLAY DEVICE

CROSS-REFERENCE TO RELATED APPLICATIONS

This application claims priority to Chinese Patent Application No. 202111647904.X, filed on Dec. 29, 2021, the entire contents of which is incorporated herein by reference.

TECHNICAL FIELD

The present disclosure relates to the technical field of displays, in particular to a backlight module and a display device applying the backlight module.

BACKGROUND

The display device includes a backlight module and a display panel provided on a light-emitting side of the backlight module. The backlight module is configured to provide a light source to the display panel. However, the light source in the backlight module generally uses blue light-emitting diodes, and a path of the blue light emitted by the blue light-emitting diodes changes after refraction, blue light is easy to leak from an edge of the backlight module, resulting in the phenomenon of blue light leaking out of the edge.

SUMMARY

The main purpose of the present disclosure is to provide a backlight module, which aims to solve the problem of blue light appearing at an edge of the backlight module.

In order to achieve the above purpose, the present disclosure provides a backlight module, including: a backplane, a light bar, and a first light absorbing member and/or a first light condensing member. The backplane includes a bottom plate and a side plate assembly connected to the bottom plate, the side plate assembly is enclosed with the bottom plate to form an accommodating cavity, the light bar is located in the accommodating cavity and is installed on the bottom plate; and the light bar has a main body part and an edge part surrounding the main body part, and the first light absorbing member and/or the first light condensing member are disposed between the side plate assembly and the edge part of the light bar.

In one embodiment, the backlight module further includes a support plate opposite to the bottom plate, the side plate assembly includes an outer side plate connected to the bottom plate and an inner side plate; the outer side plate is enclosed with the bottom plate to form the accommodating cavity; and the inner side plate is disposed on a side of the outer side plate facing the edge part of the light bar, the support plate is fixedly connected with the inner side plate, and the first light absorbing member and/or the first light condensing member are disposed on the inner side plate.

In one embodiment, the backlight module further includes a support plate opposite to the bottom plate, the side plate assembly includes a first side plate, two ends of the first side plate are respectively connected to the bottom plate and the support plate, and the first light absorbing member and/or the first light condensing member is disposed between the first side plate and the edge part of the light bar.

In one embodiment, the side plate assembly further includes a second side plate, the second side plate is connected to a side of the support plate away from the first side plate, and a second light absorbing member and/or a second light condensing member are disposed on a side of the second side plate facing the support plate.

In one embodiment, the side plate assembly further includes a third side plate, and the third side plate is connected to the support plate and disposed on a side of the first side plate away from the light bar.

In one embodiment, the support plate extends to a side of the light bar away from the bottom plate, and a third light absorbing member and/or a third light condensing member are disposed between the support plate and the side of the light bar away from the bottom plate.

In one embodiment, the third light absorbing member and/or the third light condensing member are disposed on a surface of the support plate facing the edge part of the light bar.

In one embodiment, the backlight module further includes a first diffusion plate disposed on the side of the light bar away from the bottom plate.

In one embodiment, the backlight module further includes a second diffusion plate connected to the first diffusion plate, the second diffusion plate is disposed between the edge part of the light bar and the side plate assembly, the first light absorbing member and/or the first light condensing member are disposed on a surface of the second diffusion plate facing the edge part of the light bar, and the third light absorbing member and/or the third light condensing member are disposed on a side of the first diffusion plate facing the edge part of the light bar.

The present disclosure further provides a display device, including a display panel and the backlight module mentioned above. The display panel is disposed on a side of the light bar away from the bottom plate.

In the technical solutions of the present disclosure, the bottom plate is enclosed with the side plate assembly to form the accommodating cavity, and the light bar is disposed in the accommodating cavity, the bottom plate and the side plate assembly can have a better protection effect on the light bar and can have a better gathering effect on light emitted by the light bar, thereby preventing most of the light emitted by the light bar from leaking out of the accommodating cavity. In addition, if the light bar is disposed on the bottom plate, the bottom plate further has a better supporting effect on the light bar. Further, a first light absorbing member is provided between the side plate assembly and the light bar, the first light absorbing member can absorb the light emitted by the light bar in the direction of the side plate assembly in advance, thereby avoiding a large amount of blue light from leaking out of the edge of the side plate assembly. The first light condensing member is provided between the side plate assembly and the edge part of the light bar, the first light condensing member can gather the light emitted by the light bar in a direction of the side plate assembly in advance, thereby avoiding a large amount of light in a divergent state from leaking out of the edge of the side plate assembly, and improving the problem of blue light leakage at the edge of the backlight module.

BRIEF DESCRIPTION OF THE DRAWINGS

In order to more clearly illustrate the technical solutions in the embodiments of the present disclosure or in the related art, the following briefly introduces the accompanying drawings that need to be used in the description of the embodiments or the related art. Obviously, the accompanying drawings in the following description are only some embodiments of the present disclosure. For those of ordinary skill in the art, without creative labor, other drawings can further be obtained according to the structure shown in these drawings.

The realization, functional characteristics and advantages of the purpose of the present disclosure will be further described with reference to the drawings in conjunction with the embodiments.

DETAILED DESCRIPTION OF EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all of the embodiments. Based on the embodiments in the present disclosure, all other embodiments obtained by those of ordinary skill in the art without making creative labor belong to the scope of protection of the present disclosure.

It should be noted that if the directional indication (such as up, down, left, right, front, back, etc.) is involved in the embodiment of the present disclosure, the directional indication is only used to explain the relative positional relationship, movement situation, etc. between the components under a specific posture (as shown in the drawings), and if the specific posture changes, the directional indication also changes accordingly.

In addition, if there is a description relating to "first", "second" and the like in the embodiments of the present disclosure, the description of "first", "second" and the like is only used for the purpose of description, and cannot be understood as indicating or implying the relative importance thereof or implicitly indicating a quantity of technical features indicated. Therefore, the feature defining the "first" and "second" may explicitly or implicitly include at least one of the features. In addition, the technical solutions between the various embodiments may be combined with each other, but they must be based on those of ordinary skill in the art. When the combination of the technical solutions contradicts each other or cannot be realized, it should be considered that the combination of the technical solutions does not exist and is not within the scope of protection required by the present disclosure.

The present disclosure provides a backlight module.

Figure 1:
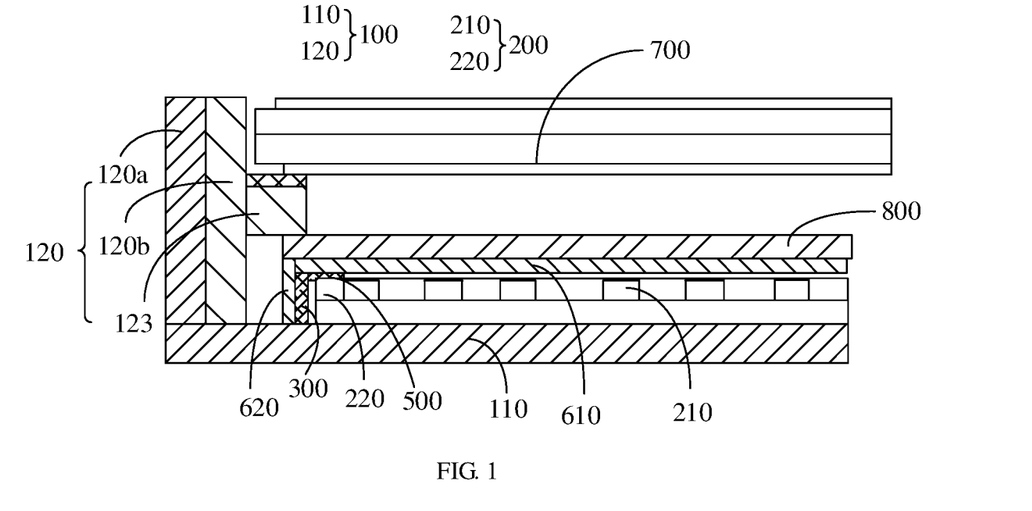
FIG. 1 is a schematic structural diagram of a backlight module according to a first embodiment of the present disclosure.

In the first embodiment, as shown in FIG. 1, the backlight module includes a backplane 100 and a light bar 200, the backplane 100 includes a bottom plate 110 and a side plate assembly 120. The side plate assembly 120 is connected to the bottom plate 110 and forms an accommodating cavity with the bottom plate 110. The light bar 200 is located in the accommodating cavity and is installed on the bottom plate 110, the light bar 200 has a main body part 210 and an edge part 220 surrounding the main body part 210. The backlight module further includes a first light absorbing member or a first light condensing member disposed between the side plate assembly 120 and the edge part 220 of the light bar 200.

The backplane 100 includes the bottom plate 110 and the side plate assembly 120. The side plate assembly 120 is connected to the bottom plate 110 and forms the accommodating cavity together with the bottom plate 110, the light bar 200 can be disposed in the accommodating cavity, so that on the one hand, it can have a better protection effect on the light bar 200, and on the other hand, it can have a gathering effect on the light emitted by the light bar 200, and the light emitted by the light bar 200 is kept in the accommodating cavity as much as possible. In addition, the light bar 200 is installed on the bottom plate 110, the bottom plate 110 has a better supporting effect on the light bar 200, and the bottom plate 110 can further have a blocking effect on the light emitted by the light bar 200. It can be understood that the backlight module may further include a diffusion plate, an optical film 800, and the like, the diffusion plate and the optical film 800 are further disposed in the accommodating cavity, so that the side plate assembly 120 of the backplane 100 can protect the diffusion plate and the optical film 800 and limit the light 800 through the diffusion plate and the optical film as much as possible in the accommodating cavity to prevent the light from spreading out.

Further, the light bar 200 includes a main body part 210 and an edge part 220 surrounding the main body part 210, the main body part 210 is configured for facing a display area of a display device to which the backlight module is applied, and the edge part 220 is facing a non-display area of the display device. The backlight module further includes a first light absorbing member and/or a first light condensing member 300 disposed between the side plate assembly 120 and the edge part 220 of the light bar 200, and a setting of the first light absorbing member and/or the first light condensing member 300 does not affect the normal display screen of the display device. The first light absorbing member and/or the first light condensing member 300 are disposed at the edge part 220 of the side plate assembly 120 and the light bar 200, then the first light absorbing member and/or the first light condensing member 300 can improve a blue light leakage at the edge part of the backlight module. It should be noted that in the present disclosure, only a first light absorbing member may be disposed between the side plate assembly 120 and the edge part 220 of the light bar 200; or only a first light condensing member is disposed between the side plate assembly 120 and the edge part 220 of the light bar 200; or both a first light absorbing member and a first light condensing member is disposed between the side plate assembly 120 and the edge part 220 of the light bar 200. When the first light absorbing member is disposed between the side plate assembly 120 and the edge part 220 of the light bar 200, the first light absorbing member can absorb the light emitted by the light bar 200 in the direction of the side plate assembly 120, thus avoiding blue light from leaking out of the edge part of the side plate assembly 120. The first light absorbing member may be a plate-like structure or a layered structure. When the first light absorbing member is a plate-like structure, a distance may be disposed between the first light absorbing member and the edge part 220 of the side plate assembly 120 and/or the light bar 200, or may be disposed tightly. When the first light absorbing member is a layered structure, the layered structure may be coated on a side of the side plate assembly 120 facing the edge part 220 of the light bar 200. Alternatively, the side plate assembly 120 may have other obstructions between the edge part 220 of the light bar 200, and the first light absorbing member of the layered structure may further be coated on other obstructions. Specifically, a material of the first light absorbing member may be black graphite, which has a light absorbing effect on the light emitted by the light bar 200, and prevents much light from leaking out of an edge of the backplane 100. The material of the first light absorbing member may further be yellow paint, which can further avoid the problem of blue light leaking out of the edge part of the backplane 100 by converting blue light into white light.

When a first light condensing member is disposed between the side plate assembly 120 and the edge part 220 of the light bar 200, the first light condensing member can gather the light in a divergent state emitted by the light bar 200 toward the direction of the side plate assembly 120, thereby better restraining the light and alleviating the problem of blue light leaking out of the edge part of the backlight module. The first condensing member may be a condensing film layer, and when the first condensing member is a condensing film layer, a high-density polyethylene or a silicone-acrylate may be configured, and the condensing film layer may be disposed on a bearing surface carrying the condensing film layer by means of physical vapor deposition or magnetron sputtering. Alternatively, the first condensing member may further adopt a lens structure having a condensing effect, such as a convex lens or other condensing member.

In the technical solutions of the present disclosure, a bottom plate 110 is enclosed with the side plate assembly 120 to form an accommodating cavity, and the light bar 200 is disposed in the accommodating cavity, then the bottom plate 110 and the side plate assembly 120 can protect the light bar 200, and can have a better gathering effect on light emitted by the light bar 200, preventing most of the light emitted by the light bar 200 from leaking out of the accommodating cavity. In addition, if the light bar 200 is disposed on the bottom plate 110, the bottom plate 110 further has a better supporting effect on the light bar 200. Further, the first light absorbing member is provided between the side plate assembly 120 and the edge part 220 of the light bar 200, the first light absorbing member can absorb the light emitted by the light bar 200 in the direction of the side plate assembly 120 in advance, avoiding much blue light leaking out of the edge part of the side plate assembly 120. The first light condensing member are provided between the side plate assembly 120 and the edge part 220 of the light bar 200, the first light condensing member can gather the light emitted by the light bar 200 in the direction of the side plate assembly 120 in advance, avoiding much light in a divergent state from leaking out of the edge part of the side plate assembly 120, improving the problem of blue light leakage from the edge part of the backlight module.

Further, as shown in FIG. 1, in the first embodiment, the backlight module further includes a support plate 123 opposite to the bottom plate 110. The side plate assembly 120 includes an outer side plate 120a and an inner side plate 120b; the outer side plate 120a is connected to the bottom plate 110, and is enclosed with the bottom plate 110 to form an accommodation cavity. The inner side plate 120b is disposed on one side of the outer side plate 120a facing the edge part 220 of the light bar 200. The support plate 123 is fixedly connected with the inner side plate 120b, and the first light absorbing member and/or the first light condensing member 300 is disposed on the inner side plate 120b.

The support plate 123 is opposite to the bottom plate 110, the support plate 123 further blocks part of light emitted by the light bar 200 disposed on the bottom plate 110, further improving the problem of light leakage at the edge part of the backlight module. In addition, the side plate assembly 120 includes an outer side plate 120a and an inner side plate 120b, the outer side plate 120a is connected to the bottom plate 110, then the outer side plate 120a and the bottom plate 110 enclose together to form an accommodation cavity, and the inner side plate 120b is disposed on a side of the outer side plate 120a facing the light bar 200, and through a combination of the inner side plate 120b and the outer side plate 120a, the side plate assembly 120 has a double blocking effect on the light emitted by the light bar 200, therefore, when the inner side plate 120b cannot block a part of the light, the inner side plate 120b can also be blocked by the outer side plate 120a. The first light absorbing member and/or the first light condensing member 300 are provided on the inner side plate 120b, a part of the blue light emitted by the light bar 200 can be filtered out in advance, improving an effect of preventing blue light from leaking out of the edge part of the backlight module.

In addition, it can be understood that the support plate 123 in this embodiment is fixedly connected with the inner side plate 120b, which ensures that the support plate 123 has a relatively stable connecting effect, when the support plate 123 and the inner side plate 120b are fixedly connected, the two can be regarded as a whole, that is, a rubber frame structure well known to those skilled in the art.

Figure 2:
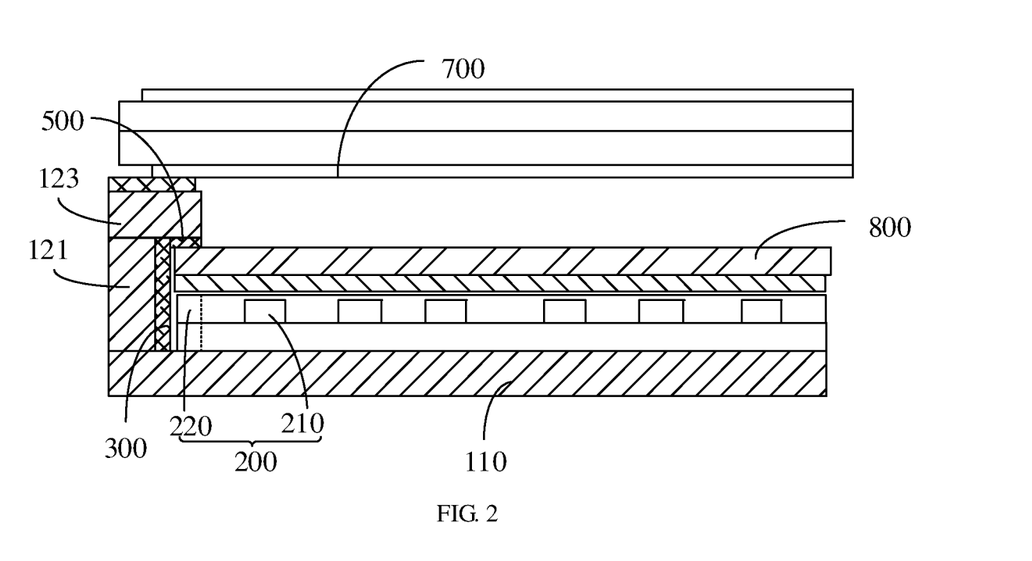
FIG. 2 is a schematic structural diagram of the backlight module according to a second embodiment of the present disclosure.

As shown in FIG. 2, in the second embodiment, the backlight module may include a support plate 123 opposite to the bottom plate 110. The side plate assembly 120 includes a first side plate 121, and two ends of the first side plate 121 are connected to the bottom plate 110 and the support plate 123 respectively. The first light absorbing member and/or the first light condensing member 300 are disposed between the first side plate and the edge part 220 of the light bar 200.

Since the side plate assembly 120 includes a first side plate 121, and two ends of the first side plate 121 are respectively connected to the bottom plate 110 and the support plate 123, the bottom plate 110 and the first side plate 121 are enclosed to form the above-mentioned accommodating cavity, and the first side plate 121 has a better supporting effect on the support plate 123. It can be understood that the side plate assembly 120 in this embodiment may only have the first side plate 121, and a quantity of side plates is reduced, reducing a quantity of gaps generated when the side plate assembly 120 is connected to other components, reducing a quantity of positions of blue light leakage, thereby achieving a better blue light leakage prevention effect.

In addition, the first light absorbing member and/or the first light condensing member 300 are provided between the first side plate 121 and the edge part 220 of the light bar 200, the first light absorbing member and/or the first light condensing member 300 can absorb or gather the light emitted by the light bar 200 to the first side plate 121 in advance, thereby preventing more blue light from being irradiated on the first side plate 121 and from leaking out in an extending direction of the first side plate. Specifically, the first light absorbing member and/or the first light-condensing member 300 may be disposed on a surface of the edge part 220, facing the light bar 200, of the first side plate 121, or a distance may be disposed between the edge part 220 of the first side plate 121 and/or the edge part 220 of the light bar 200.

Figure 3:
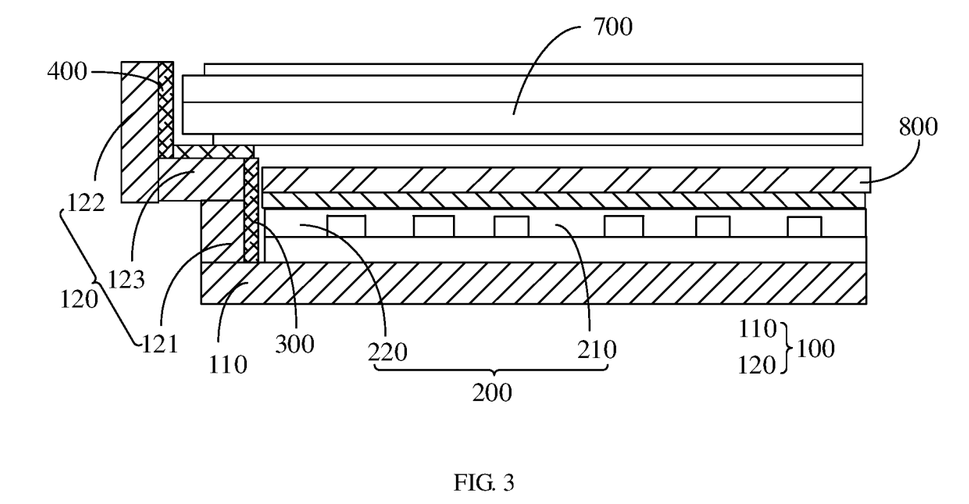
FIG. 3 is a schematic structural diagram of the backlight module according to a third embodiment of the present disclosure.

As shown in FIG. 3, the present disclosure further provides a third embodiment. The difference between the third embodiment and the second embodiment is that the side plate assembly 120 further includes a second side plate 122, the second side plate 122 connecting the side of the support plate 123 away from the first side plate 121, and the second side plate 122 facing the support plate 123 is disposed with a second light absorbing member and/or a second light condensing member 400.

By connecting a second side plate 122 to a side of the support plate 123 away from the first side plate 121, the second side plate 122 protects a display panel 700 disposed on the support plate 123. On the other hand, it can be understood that even if the first light absorbing member and/or the first light condensing member 300 are disposed between the first side plate 121 and the light bar 200, a small part of blue light still inevitably leaks out from the edge part of the first side plate 121. By connecting the second side plate 122 on the side of the support plate 123 away from the first side plate 121, the second side plate 122 further blocks the light emitted by the light bar 200 after passing through the edge part of the first side plate 121.

Further, a second light absorbing member are provided at a side of the second side plate 122 facing the support plate 123, the second light absorbing member absorbs the light emitted by the light bar 200 to the second side plate 122 and the display panel 700 through refraction, further avoiding much blue light leaking from between the second side plate 122 and the display panel 700. A second light condensing member is provided on a side of the second side plate 122 facing the support plate 123, the second light condensing member converges the light emitted by the light bar 200 to the second side plate 122 and the display panel 700 through refraction, thereby reducing the leakage of much light from the second side plate 122 and the display panel 700.

Specifically, a material of the second light absorbing member may be black graphite, which has a light absorbing effect on the light emitted by the light bar 200, and prevents much light from leaking out from the edge part of the backplane 100. The material of the second light absorbing member may also be a yellow paint, which further avoids the problem of blue light leaking out of the edge part of the backplane 100 by converting blue light into white light for emission. The second condensing member may be a condensing film layer, and when the second condensing member is a condensing film layer, high-density polyethylene or silicone-acrylate may be used. Alternatively, the second light condensing member may further adopt a lens structure having a light condensing effect or the like.

Figure 4:
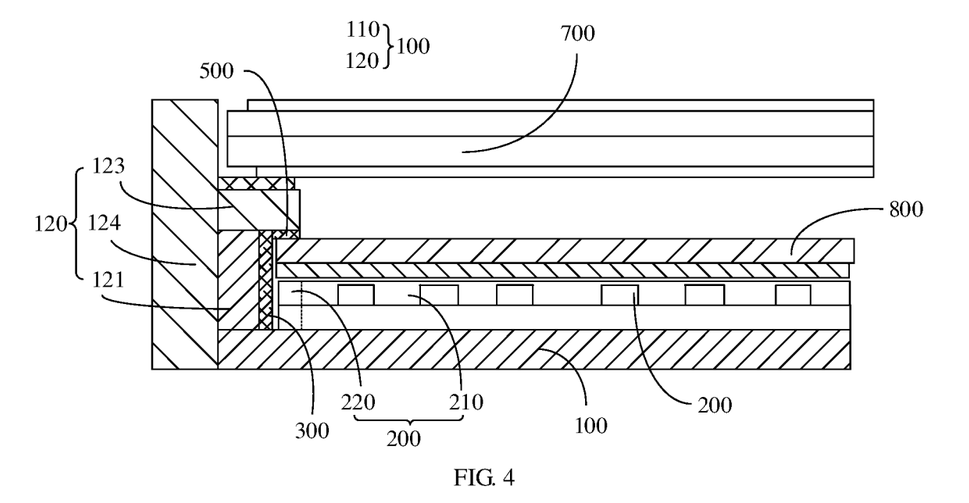
FIG. 4 is a schematic structural diagram of the backlight module according to a fourth embodiment of the present disclosure.

As shown in FIG. 4, the present disclosure further provides a fourth embodiment. A difference between the fourth embodiment and the second embodiment is that the side plate assembly 120 further includes a third side plate 124, and the third side plate 124 is connected to the support plate 123, and is disposed on a side of the first side plate 121 away from the light bar 200.

The second side plate is provided on a side of the first side plate 121 away from the light bar 200, the second side plate is connected to the support plate 123, and the support plate 123 and the second side plate are connected to form a whole, which forms a rubber frame. Therefore, the rubber frame is 121 connected to the first side plate, and both the support plate 123 and the second side plate further block the blue light leaking out of the edge part of the first side plate 121, thereby reducing the probability that the blue light leaks out of the backlight module.

As shown in FIG. 1, 2, 4 or 5, the support plate 123 extends to a side of the light bar 200 away from the bottom plate 110, and a third light absorbing member and/or a third light condensing member 500 is further disposed between the support plate 123 and the side of the light bar 200 away from the bottom plate 110.

A third light absorbing member and/or a third light condensing member 500 are provided between the support plate 123 and the side of the light bar 200 away from the bottom plate 110, much blue light emitted by the light bar 200 is prevented from leaking through a gap between the support plate 123 and an optical film 800 disposed above the light bar 200.

Specifically, the material of the third light absorbing member may be black graphite, which has a light absorbing effect on the light emitted by the light bar 200, and prevents much light from leaking out of the edge part of the backplane 100. A material of the third light absorbing member may further be yellow paint, which avoids the problem of blue light leaking out of the edge part of the backplane 100 by converting blue light into white light. The third light condensing member may be a condensing film layer, and when the third light condensing member is a condensing film layer, high-density polyethylene or silicone-acrylate may be applied. Alternatively, the third light condensing member further adopts a lens structure having a condensing effect, or the like.

Further, as shown in FIG. 2 or 4, the third light absorbing member and/or the third light condensing member 500 are disposed on a surface of the support plate 123 facing the edge part 220 of the light bar 200.

The third light absorbing member and/or the third light condensing member 500 are provided on the surface of the support plate 123 facing the light bar 200, on one hand, it fills the support plate 123 with a larger gap between the optical film 800 on the side of the light bar 200 away from the bottom plate 110, resulting in more blue light leaking out of the gap, on the other hand, it is further prevented that the third light absorbing member and/or the third light condensing member 500 affect the processing effect of the diffuser or optical film 800 on the light emitted by the light bar 200.

Figure 5:
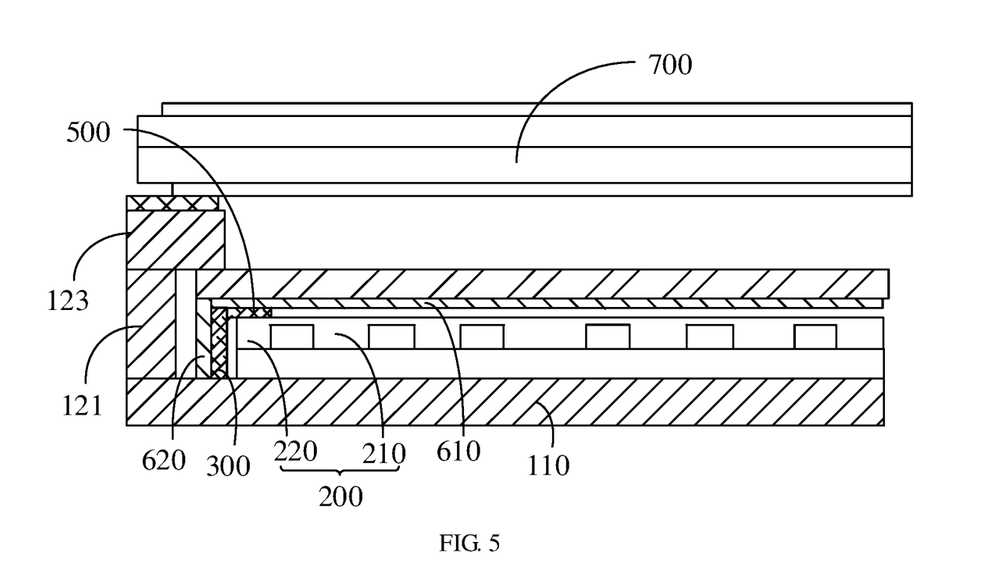
FIG. 5 is a schematic structural diagram of the backlight module according to a fifth embodiment of the present disclosure.

As shown in FIG. 1 or FIG. 5, the present disclosure further proposes a fifth embodiment. In the fifth embodiment, the backlight module further includes a first diffusion plate 610, and the first diffusion plate 610 is disposed on a side of the light bar 200 away from the bottom plate 110.

The first diffusion plate 610 is provided on the side of the light bar 200 away from the bottom plate 110, the first diffusion plate 610 diffuses the light emitted by the light bar 200 in a direction away from the bottom plate 110, ensuring that the light emitted out of the first diffusion plate 610 is more uniform.

Further, as shown in FIG. 1 or FIG. 5, the backlight module further includes a second diffusion plate 620, the second diffusion plate 620 is connected to the first diffusion plate 610 and is disposed between the edge part 220 of the light bar 200 and the side plate assembly 120, and the first light absorbing member and/or the first light condensing member 300 is disposed on the surface of the edge part 220 of the second diffusion plate 620 facing the light bar 200.

The third light absorbing member and/or the third light condensing member 500 is disposed on a side of the first diffusion plate 610 facing the edge part 220 of the light bar 200.

The second diffusion plate 620 is provided between the side plate assembly 120 and the edge part 220 of the light bar 200, and the surface of the second diffusion plate 620 facing the edge part 220 of the light bar 200 is disposed with the first light absorbing member and/or the first light condensing member 300, the second diffusion plate 620 disposes a better supporting effect for the installation of the first light absorbing member and/or the first light condensing member 300. The third light absorbing member and/or the third light condensing member 500 are provided on the side of the first diffusion plate 610 facing the edge part 220 of the light bar 200, the blue light emitted by the light bar 200 is absorbed or gathered at a position close to the light emission source (the light bar 200), thereby preventing more blue light from radiating from the edge part of the support plate 123 to the outside of the backlight module.

It can be understood that by disposing the second diffusion plate 620, the second diffusion plate 620 can support the first diffusion plate 610, and since the second diffusion plate 620 is disposed between the edge part 220 of the light bar 200 and the side plate assembly 200, the second diffusion plate 620 is corresponding to a non-display area of the display device, thereby not affecting a display effect of a display area of the display device. Further, by supporting the first diffusion plate 610 by the second diffusion plate 620, the supporting column supported between the main body part 210 of the light bar 200 and the first diffusion plate 610 can be omitted, so as to avoid the existence of the supporting column affecting the display effect of the display screen.

In addition, it can also be understood that, after the second diffusion plate 620 is disposed and the second diffusion plate 620 is fixedly connected with the first diffusion plate 610, after the supporting effect of the second diffusion plate 620 on the first diffusion plate 610 has been realized, a support strength of a support column supported between the main body part 210 of the light bar 200 and the first diffusion plate 610 and the strength of the first diffusion plate 610 can be ignored. Therefore, the first diffusion plate 610 in this embodiment may be made thinner and lighter, therefore, thickness of the backlight module is reduced as a whole, and thickness of the display device to which the backlight module is applied is reduced.

Figure 6:
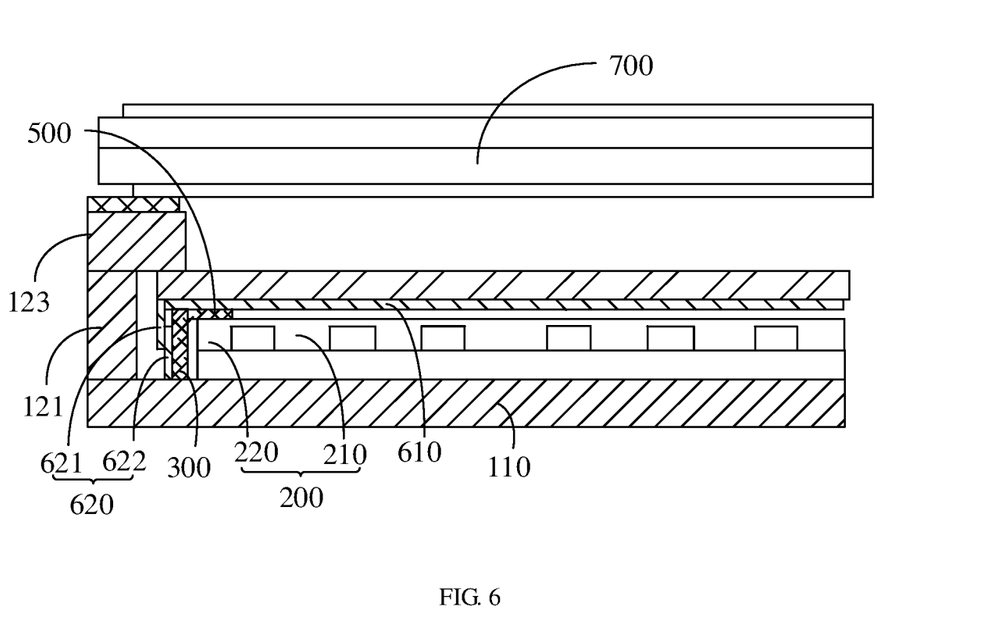
FIG. 6 is a schematic structural diagram of the backlight module according to a sixth embodiment of the present disclosure.
Figure 7:
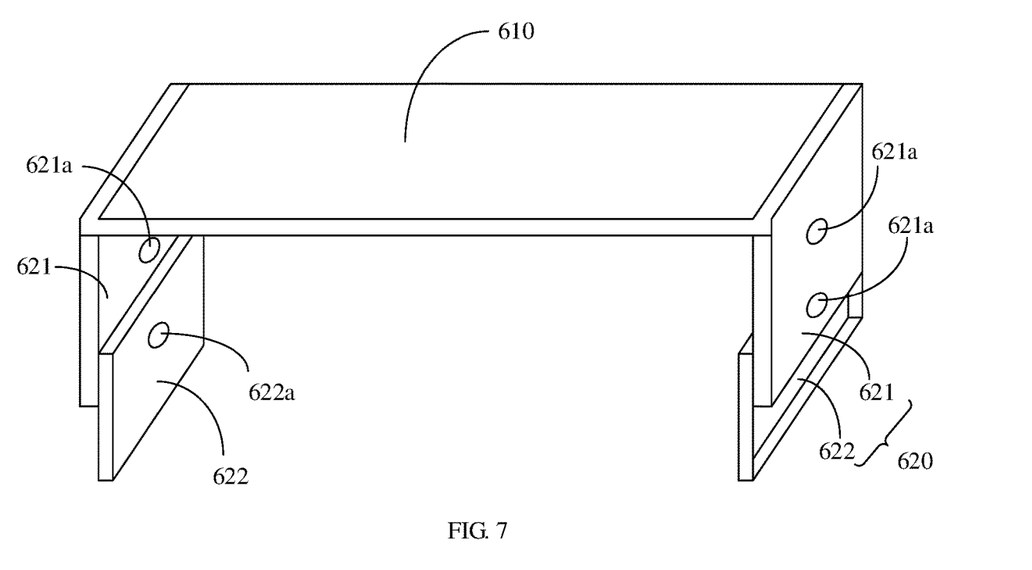
FIG. 7 is a schematic structural diagram of a first diffusion plate and a second diffusion plate of the backlight module being connected according to a sixth embodiment of the present disclosure.

The present disclosure further provides a sixth embodiment, as shown in FIG. 6 and FIG. 7, a height of the second diffusion plate 620 is adjusted in a direction perpendicular to the bottom plate 110.

A height of the second diffusion plate 620 can be adjusted in a direction perpendicular to the bottom plate 110, and the first diffusion plate 610 and the second diffusion plate 620 are fixedly connected, so that the second diffusion plate 620 can drive the first diffusion plate 610 to adjust the position in a direction perpendicular to the bottom plate 110, thereby realizing the effect of adjusting the distance (i.e., a light mixing distance) between the main body part 210 of the light bar 200 and the first diffusion plate 610. It can be understood that a better display effect can be ensured when the light mixing distance is kept in an appropriate range. If the mixing distance is too large, the display screen will be dark, if the mixing distance is too small, the display screen will be too bright.

Specifically, in order to achieve the effect that the second diffusion plate 620 can adjust the height in the direction perpendicular to the bottom plate 110, the second diffusion plate 620 may include a first connecting plate 621 and a second connecting plate 622. The first connecting plate 621 is connected to the first diffusion plate 610 and extends in the direction of the bottom plate 110, and the second connecting plate 622 is connected to a side of the first connecting plate 621 away from the first diffusion plate 610. One of the first connecting plate 621 and the second connecting plate 622 is disposed with at least two first connecting holes 621a, the other of which is disposed with at least one second connecting hole 622a. The at least two first connecting holes 621a are disposed along a direction perpendicular to the bottom plate 110, and a pin is inserted into the second connecting hole 622a and one of the first connecting holes 621a to connect the first connecting plate 621 and the second connecting plate 622.

When the at least two first connecting holes 621a are disposed in the direction perpendicular to the bottom plate 110, the second connecting hole 622a can be selected to be aligned with the lower first connecting hole 621a, so that an overall height of the second diffusion plate 620 is higher, and a height of the first diffusion plate 610 is also higher, which increases the light mixing distance between the first diffusion plate 610 and the main body part 210 of the light bar 200. Alternatively, the second connecting hole 622a may be selectively aligned with the higher first connecting hole 621a, so that the overall height of the second diffusion plate 620 is lower, and the height of the first diffusion plate 610 is also lower, at which time the light mixing distance between the first diffusion plate 610 and the main body part 210 of the light bar 200 is reduced. By adjusting the height of the second diffusion plate 620, an effect of adjusting the light mixing distance between the first diffusion plate 610 and the main body part 210 of the light bar 200 to be kept within an appropriate range can be realized, ensuring a better optical display effect.

In addition, it should be noted that, when the second connecting hole 622a is aligned with one of the first connecting holes 621a, a pin body for blocking light is further inserted into the other first connecting hole 621a that is not aligned with the second connecting hole 622a, preventing the light emitted by the light bar 200 from being emitted out of the other first connecting hole 621a that is aligned with the second connecting hole 622a.

The present disclosure further provides a display device, the display device includes a display panel 700 and a backlight module. A specific structure of the backlight module refers to the above embodiments. Since the display device adopts all the technical solutions of the above embodiments, it has at least all the beneficial effects brought by the technical solutions of the above embodiments, which will not be repeated here. The display panel 700 is disposed on the side of the light bar 200 away from the bottom plate 110.

The display panel 700 is provided on the side of the light bar 200 away from the bottom plate 110, the light bar 200 can provide light for the display panel 700, ensuring that the user sees the image from the side of the display panel 700 away from the bottom plate 110.

The above description is only a preferred embodiment of the present application, and does not therefore limit the patent scope of the present disclosure. Any equivalent structural transformation made by using the description of the present disclosure and the accompanying drawings, or direct/indirect application in other related technical fields under the inventive concept of the present disclosure, is included in the patent protection scope of the present disclosure.

What is claimed is:

1. A backlight module, comprising:
   a backplane;
   a light bar; and
   a first light absorbing member or a first light condensing member,
   wherein the backplane comprises a bottom plate and a side plate assembly connected to the bottom plate, the side plate assembly is enclosed with the bottom plate to form an accommodating cavity, the light bar is located in the accommodating cavity and is installed on the bottom plate;
   wherein the light bar has a main body part and an edge part surrounding the main body part, and the first light absorbing member or the first light condensing member is disposed between the side plate assembly and the edge part of the light bar;
   wherein the backlight module further comprises a support plate opposite to the bottom plate, the side plate assembly comprises a first side plate, two ends of the first side plate are respectively connected to the bottom plate and the support plate, and the first light absorbing member or the first light condensing member is disposed between the first side plate and the edge part of the light bar; and
   wherein the side plate assembly further comprises a second side plate, the second side plate is connected to a side of the support plate away from the first side plate, and a second light absorbing member or a second light condensing member is disposed on a side of the second side plate facing the support plate.

2. The backlight module of claim 1, further comprising:
   a support plate opposite to the bottom plate,
   wherein the side plate assembly comprises an outer side plate connected to the bottom plate and an inner side plate;
   wherein the outer side plate is enclosed with the bottom plate to form the accommodating cavity; and
   wherein the inner side plate is disposed on a side of the outer side plate facing the edge part of the light bar, the support plate is fixedly connected with the inner side plate, and the first light absorbing member or the first light condensing member are disposed on the inner side plate.

3. The backlight module of claim 1, wherein the bottom plate and the first side plate are enclosed to form the accommodating cavity.

4. The backlight module of claim 1, wherein the side plate assembly further comprises a third side plate, and the third side plate is connected to the support plate and disposed on a side of the first side plate away from the light bar.

5. The backlight module of claim 1, wherein the support plate and the second side plate are connected to form a rubber frame.

6. The backlight module of claim 2, wherein the support plate extends to a side of the light bar away from the bottom plate, and a third light absorbing member or a third light condensing member are disposed between the support plate and the side of the light bar away from the bottom plate.

7. The backlight module of claim 6, wherein the first light absorbing member, the second light absorbing member, the third light absorbing member are made of black graphite or yellow paint.

8. The backlight module of claim 6, wherein when the first light condensing member, the second light condensing member or the third light condensing member are condensing film layers, high-density polyethylene or silicone-acrylate is applied on the first light condensing member, the second light condensing member or the third light condensing member.

9. The backlight module of claim 6, wherein the third light absorbing member or the third light condensing member are disposed on a surface of the support plate facing the edge part of the light bar.

10. The backlight module of claim 6, further comprising:
    a first diffusion plate disposed on the side of the light bar away from the bottom plate.

11. A display device, comprising:
    a display panel; and
    a backlight module comprising:
       a backplane;
       a light bar; and
       a first light absorbing member or a first light condensing member,
       wherein the backplane comprises a bottom plate and a side plate assembly connected to the bottom plate, the side plate assembly is enclosed with the bottom plate to form an accommodating cavity, the light bar is located in the accommodating cavity and is installed on the bottom plate;
       wherein the light bar has a main body part and an edge part surrounding the main body part, and the first light absorbing member or the first light condensing member is disposed between the side plate assembly and the edge part of the light bar;
       wherein the display panel is disposed on a side of the light bar away from the bottom plate;
       wherein the backlight module further comprises a support plate opposite to the bottom plate, the side plate assembly comprises a first side plate, two ends of the first side plate are respectively connected to the bottom plate and the support plate, and the first light absorbing member or the first light condensing member is disposed between the first side plate and the edge part of the light bar; and
       wherein the side plate assembly further comprises a second side plate, the second side plate is connected to a side of the support plate away from the first side plate, and a second light absorbing member or a second light condensing member is disposed on a side of the second side plate facing the support plate.

* * * * *